United States Patent Office 3,793,351
Patented Feb. 19, 1974

3,793,351
PROCESS FOR SOLUBILIZING ALKOXYLATED FATTY SUBSTRATES
Frederic C. McCoy, % Texaco Inc., P.O. Box 509, Beacon, N.Y. 12508
No Drawing. Filed Dec. 13, 1971, Ser. No. 207,550
Int. Cl. C10m 1/32
U.S. Cl. 260—404         17 Claims

ABSTRACT OF THE DISCLOSURE

This invention concerns a process for converting alkoxylated fatty substrates normally insoluble in petroleum oils to soluble complexes by treatment with alkylated phenol-type solubilizing agents, and the oil soluble complexes resulting therein.

---

This invention concerns a process for solubilizing substrates normally insoluble in petroleum oils.

More particularly, this invention relates to petroleum-soluble complexes formed by the treatment of alkoxylated substrates normally insoluble in petroleum oils, with alkylated phenol-type solubilizing agents.

Generally, the imparting of, or improvement of, the surface properties of organic compounds is highly desirable. Good surfactant properties permit the composition to wet more readily, remove soil, penetrate porous surfaces, disperse solid particles and the like. Compounds possessing good surface-active properties are commonly classified according to the character of their colloidal solutions in water. That is either as ionics or nonionics. The nonionics do not ionize but owe their surfactant properties to a number of weak solubilizing groups such as ether linkages. The nonionics containing ether linkages are most commonly made by alkoxylating organic substrates containing active hydrogens with an excess of the lower alkylene oxides such as ethylene and propylene oxides until the desired number of alkoxy groupings have been placed in the molecule. While the resultant alkoxylated derivatives possess good solubility in aqueous solutions they frequently have poor solubility in oils, particularly paraffin-based oils. (As used herein, poor solubility is defined throughout this application as not possessing sufficient solubility to permit a clear 0.10% by weight solution of the compound in question to be prepared in a SAE 20 paraffin base oil at 75–80° F.)

In a number of instances alkoxylated fatty acid derivatives such as ethoxylated fatty amines, amides, alcohols and the like which have desirable anti-rust, anti-wear and oiliness properties cannot be employed in napthenic or paraffin base oils because of their poor solubility. A process of solubilizing these derivatives would be extremely valuable in the formulation of petroleum products, particularly lubricating oils and greases.

Ideally, the solubilizing process would be operable at amibent or near ambient temperatures and atmospheric pressures, would utilize readily available materials and could be performed by routine personnel using presently available process equipment. In addition, the process should be rapid and would not require the purification of the treated substrate. A process possessing these attributes would represent an advance in the art.

It is an object of this invention among others to substantially increase the oil solubility of alkoxylated substrates normally insoluble in paraffinic oils.

A more particular object of this invention is the solubilization of ethoxylated fatty acid derivatives such as alcohols, amines, amides, quaternary amines and the like by a mild treating process heretofore undescribed in the art.

Other objects include the development of a simplified solubilization process and providing treatment mixtures or alkoxylated substrates solvent and treating agents which can be employed in lubricating stocks without preliminary purification.

Additional objects will become apparent after a reading of this specification.

In practice, an alkoxylated organic substrate whose solubility in oil is to be increased is treated with an alkylated phenol-type compound and at ambient or above ambient temperatures until a substantially clear homogeneous complex is obtained. This complex can be blended either by itself or with minor amounts of other desired lubrication additives and major amounts of lubricating oil stocks to produce lubricant compositions.

In the preferred practice, alkylated phenols, fatty acids, fatty amines, fatty amides, fatty oximes, fatty nitriles or the like, previously ethoxylated with from 1 to 50 moles of ethylene oxide are mixed with a solubilizing amount of at least one alkylated-phenol type compound, and heated if necessary to produce an oil-soluble complex. This complex can be blended as indicated supra with other additives and lubricating oils to produce lubricating compositions.

In order to more clearly set forth the scope of the subject invention the following additional disclosure is submitted.

(A) Alkylated phenol-type compound.—This is the generic designation used to define the solubilizing agents of this invention. These agents are chosen from the mono- and dinuclear aromatics that contain at least one hydroxyl group and an alkylating group or groups containing a total of between 3 and 100 carbon atoms, arranged in either branched chains or straight chains. Where the alkylating moiety is $C_{12}$ or higher the metal phenates, particularly the alkali metal and alkaline earth metal phenates may be employed. The alkylated pheonol-type "compound" can be in the form of a relatively pure discrete single compound or in the form of blends or mixtures of one or more alkylated phenols. Depending upon their physical state, solid or liquid, or the convenience of the user, the solubilizing compounds can be used with or without low-boiling solvents to assist in preparing the complexes. The low-boiling solvent is normally removed in a subsequent stripping operation. In the case where either or both the solubilizing agents and the alkoxylated substrate are in the solid state, it may be expeditious to heat the solid or solids to their melting points and then to blend to a homogeneous mixture.

Inasmuch as cost, convenience, availability and stability are all factors to be considered in choosing the solubilizing agents, the favored alkylated phenol-type solubilizing agents are the alkylated hydroxy mononuclear aromatics such as the alkylated phenols, cresols and the like. These compounds are produced in tonnage quantities, are available at relatively low cost and function extremely well in solubilizing alkoxylated substrates, particularly ethoxylated substrates. These compositions in the form of both their unresolved mixtures or relatively pure fractions or single compounds are usually derived from the direct reaction of olefins with hydroxy aromatic under reaction conditions already extensively described in the patent and technical literature.

Illustrative preferred solubilizing agents are the butyl phenols, the pentyl phenols, the hexyl phenols, the heptyl phenols, the octyl phenols, the nonyl phenols, the decyl phenols, the undecyl phenols, the dodecyl phenols, the tridecyl phenols as well as alkylated di- and polyhydroxylated phenols and their homologues, also diisopropyl phenols, dibutyl phenols, dioctyl phenols and dinonyl phenols. Especially preferred are the alkylated phenols in which the alkyl groups contain from 9 to 16 carbon atoms, and are branched rather than straight chain.

(B) Alkoxylated substrates.—As indicated earlier, the prime limitations on the substrates are that they:

(1) Lack normal oil solubility in paraffinic oils to the extent that less than 0.10% of the alkoxylated substrate is soluble in a SAE 20 paraffinic oil at ambient temperatures. Visual determination is used as the test in determining whether a given solution is unclear or hazy or contains a separated phase or precipitate.

(2) The structural limitations of the alkoxylated substrate have not been determined. Generally, alkoxylated fatty acids and their derivatives such as amines, amides, alcohols, mercaptans, oximes, nitriles, etc. as well as alkoxylated quaternary ammonium salts, serve as substrates as do the alkoxylated alkyl phenols having a molecular weight range of up to about 8,000. The solubility of fatty acids and their derivatives which have been alkoxylated with 1 to 50 or more groups, particularly ethoxylated with from 1 to 30 groups are especially improved when exclusive of alkoxy groups, the fatty moiety contains from 2 to 22 carbon atoms. In the case of the ethoxylated alkyl phenols, the alkyl groups will most frequently contain from 8 to 20 carbon atoms preferably 9 to 16 carbon atoms.

A listing of illustrative ethylene oxide adducts prepared by direct ethoxylation appears below:

Fatty acid

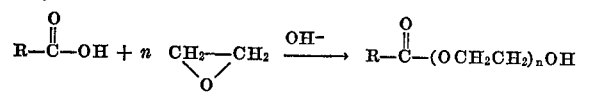

Alkylphenol

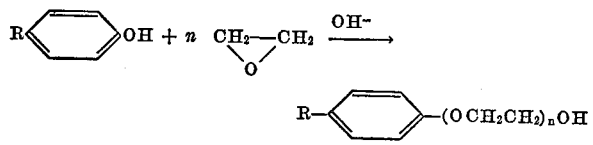

Alkyl mercaptan

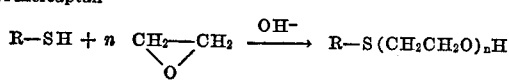

Fatty alcohol

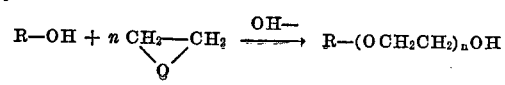

Fatty amide

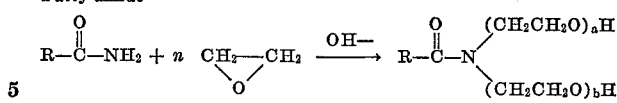

Polypropylene glycol

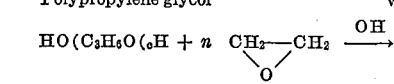

where $a+b=n$, and $c=1$ to $50$

Quaternary $NH_4$ salts

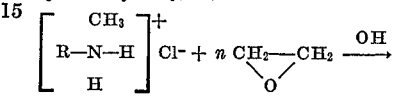

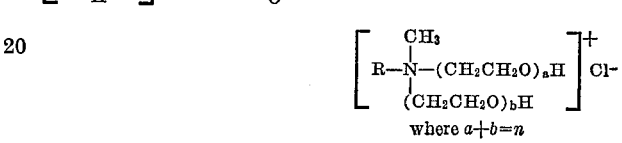

where $a+b=n$ wherein R is an alkyl radical of from 2 to 22 carbon atoms. It should be noted that the alkoxylation can also be performed by condensing the appropriate alkanolamines such as diethanolamine monoethanolamine, isopropanolamine with fatty acids or their esters or the esterification of polyols such as glycerol, polyethylene glycol and sorbital or carbohydrates such as sucrose.

All of the alkoxylated substrates are known compounds and the ethoxylated alkyl phenols such as ethoxylated octyl phenol, nonylphenol, dodecylphenol and dinonylphenol, the ethoxylated alkyl mercaptans such as ethoxylated tert. dodecyl mercaptan, ethoxylated fatty acids such as ethoxylated coconut fatty acids, soybean fatty acids, oleic acid and stearic acid, ethoxylated fatty alcohol derivatives such as ethoxylated lauryl, oleyl, cetyl, stearyl, tridecyl alcohols; ethoxylated fatty amides, ethoxylated polyalkylene polyols such as polypropylene glycol and ethoxylated quaternary ammonium salts are commercially available materials.

(C) Conditions required for the solubilizing treatment.—The conditions required for the practice of the solubilizing process of this invention are not critical. The usual procedure where both the substrate and solubilizing agent are in the liquid state is to add the substrate to the stirred solubilizing agent and to continue the stirring until a clear solution is obtained. If difficulty in solution is encountered, heating, usually up to about 175° F., will accelerate formation of the desired oil-soluble complex. Higher heating temperatures can be used but are seldom necessary. Where one or both the substrate and solubilizing agent are solids the usual practice is to melt the solid and stir in the liquid. If both are solids, it is most convenient to add both materials together and "melt" blend until a clear mixture is obtained. The time required for preparation of the complex cannot be set forth precisely since it is dependent upon the particularly substrate and solubilizing agent and their physical state. However the time ordinarily will not exceed one hour and in most instances will be between a few minutes up to less than one-half hour. Inert low-boiling solvents such as benzene, acetone or tetrahydrofuran, for example, can be employed to facilitate contact between the substrate and the solubilizing agent. Where a homogeneous solution is attained, the solvent is removed by a conventional stripping procedure.

The solubilizing agent is generally used in quantities at least equal to the substrate. The precise ratios are variable dependent upon the type of alkoxylation, the extent of alkoxylation, the solubilizing agent used and the type of oil the complex is to be dissolved into. In general terms where the substrates are ethoxylated with from 1 to 30 ethoxy groups the ratios are as follows:

(a) For naphthenic oils—on a weight basis the ratio of solubilizer to substrate varies from 1:2 to 10:1, preferably from 2:1 to 4:1.

(b) For paraffinic oils—on a weight basis the ratio of solubilizer to substrate varies from 1:1 to 20:1, preferably from 2:1 to 8:1.

(D) Preferred solubilizing composition.—As indicated previously, while all of the alkyl phenol-type solubilizing agents can be utilized as solubilizing agents the favored group comprises the alkylated hydroxy mononuclear aromatics. Within this relatively narrow class of solubilizers, the preferred group comprises the monohydroxy benzenes alkylated with alkyl groups containing from 9 to 16 carbon atoms. These work most effectively on the ethoxylated substrates selected from the group consisting of ethoxylated alkyl phenols, fatty acids, fatty amides, fatty amines and fatty alcohols which contain from 1 to 30 ethoxy groups ($-OCH_2CH_2-$) and have from 2 to 22 carbon atoms in the hydrocarbyl moiety preferably 12–18 carbon atoms, exclusive of ethoxy groups. These phenol-complexed ethoxylated alkyl-phenols, and ethoxylated fatty derivatives comprise the preferred compositions of this invention.

(E) Solution of solubilized ethoxylate in oil.—After preparing the complexes of alkyl phenol and ethoxylates described in the preceding sections they may be incorporated in oil in the conventional manner for blending lubricant additives, that is, the oil additive mixture may be heated to 150–180° F. with mechanical stirring for about 15 minutes. In some cases, satisfactory solubilization may be achieved by adding the phenol and ethoxylate separately to the oil followed by heating to 150–180° F. with stirring. However, since considerably longer stirring times may be required, the prior mixing of the additive ingredients is much to be preferred.

In order to disclose this invention in the greatest possible detail, the following illustrative examples are submitted.

EXAMPLE 1

Solubilization of an alkoxylated alkyl phenol

In this run a nonyl phenol which had been previously ethoxylated with an average of 30 ethoxy groups ($CH_2CH_2O$) per molecule, and having a molecular weight of 1180 is used as the oil-insoluble substrate. The procedure below describes the evaluation of the control uesd alone and with the use of a solubilizer.

(A) Procedure for control evaluation.—A 1.0 parts by weight sample of the ethoxylated nonyl phenol is added to a stirred 999 parts by weight portion of a paraffin base SAE 20 oil previously heated to and kept at 180° F. After a short time, a clear oil solution is obtained, but upon allowing the stirred oil-ethoxylated phenol solution to cool at 80° F., a hazy solution develops accompanied by precipitation. This indicates the solubility of the untreated substrate in paraffin base SAE 80 oil to be substantially less than 0.1% by weight.

(B) Procedure for solubilizer treated substrate.—Twenty and thirty parts by weight portions of the same ethoxylated phenol are added to two reaction flasks containing portions of dodecyl phenol heated to 150° F. The 20 parts by weight portion of the ethoxylated material is added to 80 parts by weight of the dodecyl phenol and the 30 to 70 parts of the dodecyl phenol. While hot, 20 parts of each of the above hot complex concentrates are added to 980 parts by weight portions of the same SAE 20 paraffinic oil (used in part (A)) and heated with stirring. On cooling to 80° F., the oil containing the 20–80 blend (0.4% ethoxylated phenol+1.6% solubilizer) was clear while the oil containing the 30–70 blend (0.6% ethoxylated phenol+1.4% solubilizer) was cloudy and contained precipitated material. This indicates that dodecyl phenol is an effective solubilizer at a weight ratio of 4 parts of dodecyl phenol for each part of ethoxylated nonyl phenol. At a ratio of 2.33:1 satisfactory solubility is not achieved. The results of sections A and B are summarized in Table I.

EXAMPLE 2

Solubilization of another less highly ethoxylated nonyl phenol

In this example a nonyl phenol ethoxylated with an average of 15 ethoxy groups per molecule is the substrate and the same dodecyl phenol used in Example 1 is the solubilizer. One part by weight portion of the substrate when admixed with 999 parts of the same paraffinic SAE 20 oil using the same techniques described in part (A) of the preceding example produces a clear oil at 180° F. which separates into two clear phases at 80° F. Following the precise procedure of part (B) of the preceding example, 30 parts by weight of the ethoxylated substrate are heated with 70 parts by weight of the dodecyl phenol to produce a complex concentrate. A 20 part by weight portion of the concentrate is blended at 180° F. with 980 parts by weight of the paraffinic oil, to produce a clear solution which remains clear at 80° F. This blend contains 6 parts ethoxylated phenol per 1000 parts of solution. A ratio of dodecylphenol to ethoxylated phenol of 2.33:1 is seen to be sufficient in this case to achieve satisfactory solubility in paraffinic oil.

EXAMPLE 3

Solubilization of an ethoxylated tridecylalcohol

The precise process of section A and section B as described in the preceding examples is followed. Tridecyl alcohol ethoxylated with 12 mols ethylene oxide when used as a control (1.0 part by weight) with 999 parts by weight of the paraffinic oils of the preceding examples gives a clear solution at 180° F. but upon cooling to 80° F. after 24 hours produces a hazy solution. When 10 parts by weight of the ethoxylated substrate and 90 parts by weight of 284 molecular weight alkylated phenol are made into a concentrate and the concentrate blended into the paraffinic oil to give a concentration of 2 parts ethoxylated substrate and 18 parts dodecylphenol per 1000 parts of the blend a clear solution is obtained which remains clear at 80° F. A similar result is obtained when 30 parts ethoxylated substrate and 70 parts dodecylphenol are made into a concentrate and added to paraffinic oil to give 6 parts ethoxylated substrate and 14 parts of the blend.

EXAMPLE 4

Solubilization of an ethoxylated fatty amide

Using the same procedures previously described for sections A and B, a 1.0 part by weight portion of an ethoxylated oleamide containing an average of 5 ethoxy groups per molecule is blended with 999 parts by weight of paraffinic oil to give a blend which is hazy after 24 hours at 80° F. when concentrates of this material in a 284 molecular weight alkylphenol are prepared containing 10, 20, 30, 40 and 50% by weight of the ethoxylated amide it is found that each of these, when blended in a paraffinic oil, to give 2, 4, 6, 8 and 10 parts ethoxylated amide per 1000 parts of blend provided clear solutions after 24 hours at 80° F.

EXAMPLES 5–19

Solubilization of different substrates using various alkyl phenols

In these experiments the procedures described in the preceding examples are followed precisely for the alkoxylated substrates and solubilizers shown in Table I.

TABLE I

| Example | Alkoxylated substrate (AS¹) | Alkylated phenol type solubilizer (S²) | Parts by weight Section A | Section B | Section C, ratio S to AS | Solubility of blends Upon blending at 180° F. | After 24 hrs. at 80° F. |
|---|---|---|---|---|---|---|---|
| 1 | $C_9H_{19}$—⬡—$O(CH_2CH_2O)_{30}H$ | Dodecylphenol, mol. wt.=242. | 1AS-999PO³ | | | Clear | Turns hazy, ppt. |
| | | | | 4AS-16S-980PO | 4:1 | do | Remains clear. |
| | | | | 6AS-14S-980PO | 2.33:1 | do | Hazy, ppt. |
| | | | | 6AS-2AS-970PO | 4:1 | do | Remains clear. |
| 2 | $C_9H_{19}$—⬡—$O(CH_2CH_2O)_{15}H$ | do | 1AS-999PO | | | do | Separates into 2 phases. |
| | | | | 6AS-14S-980PO | 2.33:1 | do | Clear, homogeneous. |
| 3 | $C_{13}H_{27}$—$O$—$(CH_2CH_2O)_{12}H$ | Phenol alkylated with propylene tetramer to A, mol. wt. of 284. | 1AS-999PO | | | do | Turns hazy. |
| | | | | 2AS-18S-980PO | 9:1 | do | Remains clear. |
| | | | | 6AS-14S-980PO | 2.33:1 | do | Do. |
| 4 | $C_{18}H_{35}$—$\overset{O}{\overset{\|}{C}}$—$N\begin{pmatrix}(CH_2CH_2O)_xH\\(CH_2CH_2O)_yH\end{pmatrix}$  Where x+y=5 | Alkylated phenol of example 3. | 1AS-999PO | | | do | Turns hazy. |
| | | | | 2AS-18S-980PO | 9:1 | do | Remains clear. |
| | | | | 4AS-16S-980PO | 4:1 | do | Do. |
| | | | | 6AS-14S-980PO | 2.33:1 | do | Do. |
| | | | | 8AS-12S-980PO | 1.5:1 | do | Do. |
| | | | | 10AS-10S-980PO | 1:1 | do | Do. |
| 5 | $C_{18}H_{37}$—$\overset{O}{\overset{\|}{C}}$—$N\begin{pmatrix}(CH_2CH_2O)_xH\\(CH_2CH_2O)_yH\end{pmatrix}$  Where x+y=5 | do | 1AS-999PO | | | Hazy | Remains hazy. |
| | | | | 2AS-18S-980PO | 9:1 | Clear | Remains clear. |
| | | | | 6AS-14S-980PO | 2.33:1 | do | Do. |
| | | | | 8AS-12S-980PO | 1.5:1 | do | Ppt. forms. |
| 6 | Substrate of example 4 | Nonylphenol, mol. wt.=220. | 1AS-999PO | | | do | Turns hazy. |
| | | | | 2AS-18S-980PO | 9:1 | do | Remains clear. |
| | | | | 10AS-10S-980PO | 1:1 | do | Turns hazy. |
| 7 | Substrate of example 4 | Phenol alkylated with polyisobutylene, mol. wt.=460. | 1AS-999PO | | | do | Do. |
| | | | | 4AS-16S-980PO | 4:1 | do | Remains clear. |
| | | | | 10AS-10S-980PO | 1:1 | do | Do. |
| 8 | do | 2,6-ditertiary butylphenol, mol. wt.=206. | 1AS-999PO | | | do | Turns hazy. |
| | | | | 6AS-14S-980PO | 2.33:1 | Very slight haze. | Very slight haze. |
| 9 | $\begin{bmatrix}CH_3 & C_2H_4OH\\C_{18}H_{37}-N\\ & C_2H_4OH\end{bmatrix}^+ Cl^-$ | Alkylated phenol of example 3. | 1AS-999PO | | | Hazy, ppt. | Hazy, plt. |
| | | | | 4AS-16S-980PO | 4:1 | Clear | Remains hazy. |
| | | | | 6AS-14S-980PO | 2.33:1 | do | Do. |
| | | | | 10AS-10S-980PO | 1:1 | Hazy | Remains hazy. |
| 10 | $\begin{bmatrix}CH_3 & (C_2H_4O)_3H\\C_{18}H_{35}-N\\ & (C_2H_4O)_2H\end{bmatrix}^+ Cl^-$ | do | 1AS-999PO | | | do | Do. |
| | | | | 4AS-16S-980PO | 4:1 | Clear | Remains clear. |
| 11 | $C_{12}H_{25}$—$N\begin{pmatrix}(CH_2CH_2O)_xH\\(CH_2CH_2O)_yX\end{pmatrix}$  X+Y=15 | do | 1AS-999PO | | | do | Turns hazy. |
| | | | | 6AS-14S-980PO | 2.33:1 | do | Remains clear. |
| 12 | $CH_3(CH_2)_{16}\overset{O}{\overset{\|}{C}}$—$O(CH_2CH_2O)_{10}H$ | do | 1AS-999PO | | | do | Turns hazy. |
| | | | | 6AS-14S-980PO | 2.33:1 | do | Remains clear. |
| 13 | Substrate of example 4 | 2,6-diisopropyl phenol, mol. wt.=178. | 1AS-999PO | | | do | Turns hazy. |
| | | | | 6AS-24S-970PO | 4:1 | do | Remains clear. |
| 14 | do | 2,4-disec. butyl phenol, mol. wt.=206. | 1AS-999PO | | | do | Turns hazy. |
| | | | | 6AS-24S-970PO | 4:1 | do | Remains clear. |
| 15 | do | 2,6-dimethyl phenol, mol. wt.=146. | 1AS-999PO | | | do | Turns hazy. |
| | | | 1AS-999NO | | | do | Oil clear, insol. residue. |
| | | | | 6AS-24S-970PO | 4:1 | Cloudy, ppt. | Cloudy, ppt. |
| | | | | 6AS-24S-970NO⁴ | 4:1 | Hazy | Remains hazy. |
| 16 | Substrate of example 1 | Dodecylphenol, mol. wt.=242. | 1AS-999NO | | | Clear | Flocculent ppt. |
| | | | | 4AS-16S-980NO | 4:1 | do | Remains clear and homogeneous. |
| 17 | Reaction product of ethylene diamine with ethylene and propylene oxides (approx. 2,700 mol. wt. with ratio of ETO to PRO about 1:9). | Alkylated phenol of example 3. | 1AS-999PO | | | do | Turns hazy. |
| | | | | 9AS-21S-970PO | 2.33:1 | Slightly hazy. | Turns clear. |
| 18 | Polyethylene glycol tert. Dodecyl thioether. | do | 1AS-999PO | | | Clear | Turns hazy. |
| | | | | 9AS-21S-970PO | 2.33:1 | do | Remains clear. |
| 19 | Substrate of example 4 | P-tert. butyl-phenol, mol. wt.=149. | 1AS-999PO | | | do | Turns hazy. |
| | | | | 6AS-24S-970PO | 4:1 | do | Remains clear. |

¹ Alkoxylated substrate.
² Alkylated phenol-type solubilizer.
³ PO=Paraffinic oil (SAE-20).
⁴ Naphthenic Oil (300 S.U.S. at 100° F.)

The following conclusions may be drawn from these data:

(A) Ethoxylated stearamide, ethoxylated quaternary ammonium chlorides, ethoxylated amine, ethoxylated fatty acid, ethoxylated propoxylated ethylene diamine and ethoxylated alkyl mercaptan can be solubilized by the use of suitable alkylphenols (Examples 5, 9, 10, 11, 12, 17 and 18 respectively).

(B) Monoalkyl phenols ranging in molecular weight from 149 (Example 19) to 460 (Example 7) are effective solubilizers. A dialkyl phenol of as low as 178 molecular weight (Example 13) is also effective.

(C) Solubilization is achieved in a naphthenic oil (Example 16), as well as in the paraffinic oil used in the other examples.

(D) A ratio of alkylphenol to ethoxylate of less than 2.33:1 is enough to achieve solubilization in some cases (Examples 4 and 7) but not in others (Examples 5, 6 and 9).

One evidence of the utility of the solubilized alkoxylates of Table I is the fact that many of these compositions form stable emulsions upon agitation with water (100 ml. oil added slowly to 100 ml. water). Clear blends chosen at random from Examples 1, 2, 3, 4, 5, 8, 11 and 12 form stable water-oil emulsions under these conditions. When oil containing the corresponding alkylphenol alone are used, coarse dispersions are formed which separate into two phases as soon as agitation is stopped.

As the numerous examples and the specification indicate, the novel invention offers seevral advantages both in process and compositional aspects.

Insofar as the process is concerned, this is the first instance of where a variety of alkoxylated substrates normally insoluble in petroleum oils such as paraffinic or naphthenic oils can be sufficiently solubilized without drastically altering the nature of the molecule. Since there is no likelihood of a chemical reaction taking place other than possible hydrogen bonding, it is suprising to find that an oil-soluble complex can be formed under these very mild treatment conditions. Although hydrogen bonding is considered a possible explanation for the solubilization observed, no specific mechanism is relied on or advanced. The process is further advantageous in that it proceeds rapidly usually at near ambient temperatures using inexpensive and readily available solubilizers and produces a stable oil-soluble complex.

In its compositional aspects, the invention permits the formulation of petroleum based lubricants containing heretofore unavailable alkoxylated additives having utility as surfactants, antifoulants, rust inhibitors and the like in crankcase oils, automatic transmission fluids, cutting oils, gear lubricants and related oils. In addition, many of the blended complexes can be used to produce stable emulsions when blended with water, as heretofore described.

As can be seen from an examination of the preceding disclosure, numerous changes, variations, modifications and the like can be made in substrates, solubilizers, proportions, temperatures and the like without departing from the inventive concept. The metes and bounds of this invention are best determined by the claims which follow taken in conjunction with this specification.

What is claimed is:

1. A process for converting alkoxylated fatty substrates containing from 1 to 50 alkoxylated groups, said susbtrates normally being insoluble in a 0.10% by weight solution mineral oil at 75° F. to 80° F., to their corresponding oil-soluble complexes comprising:
    (a) admixing each part by weight of at least one alkoxylated substrate to be solubilized selected from the group consisting of alkoxylated fatty amides, alkoxylated fatty amines, alkoxylated fatty diamines and alkoxylated fatty quaternary ammonium salts, said alkoxylating groups being selected from the group consisting of ethoxylated groups, propoxylate groups and mixtures of ethoxylate and propoxylate groups, said fatty moieties containing from 2 to 22 carbon atoms exclusive of alkoxylate groups,
    (b) with a 2 to 10 parts by weight portion of at least one alkyl phenol selected from the group consisting of alkyl mononuclear phenols and alkyl dinuclear phenols wherein said alkyl groups contain a total of between 3 and 100 carbon atoms, until said corresponding oil-soluble complex is produced.

2. The process of claim 1 wherein the alkyl phenol is an alkyl mononuclear phenol in which the alkyl groups are branched and contain from 9 to 16 carbon atoms.

3. The process of claim 2 wherein the alkoxylated fatty substrate to be solubilized is an alkoxylated quaternary ammonium salt.

4. The process of claim 3 wherein the alkoxylated fatty quaternary ammonium salt is ethoxylated oleyl methyl ammonium chloride.

5. The process of claim 4 wherein the alkoxylated fatty quaternary ammonium salt is ethoxylated stearyl methyl ammonium chloride.

6. The process of claim 1 wherein the alkoxylated fatty substrate is an alkoxylated fatty amine.

7. The process of claim 6 wherein the alkoxylated fatty amine is ethoxylated dodecylamine.

8. The process of claim 6 wherein the alkoxylated fatty amine is an ethoxylated and propoxylated ethylene diamine.

9. The process of claim 1 wherein the alkoxylated fatty substrate is an alkoxylated fatty amide.

10. The process of claim 9 wherein the alkoxylated fatty amide is:

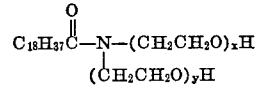

wherein $x+y=5$.

11. The process of claim 9 wherein the alkoxylated fatty amide is:

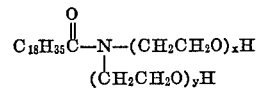

wherein $x+y=5$.

12. The process for converting ethoxylated dodecylamine containing about 15 ethoxylate groups in the molecule, said ethoxylated dodecylamine normally being insoluble in a 0.10% by weight concentration in paraffinic oil at 75° F. to 80° F., to its paraffinic oil-soluble form comprising:
    (a) admixing each part by weight portion of said ethoxylated dodecylamine to be solubilized,
    (b) with a 2 to 10 parts by weight portion of phenol alkylated with propylene tetramer, said alkylated phenol having a molecular weight of about 284, until a paraffinic oil-soluble ethoxylated dodecylamine is produced.

13. The process for converting ethoxylated oleamide containing about 5 ethoxylate groups in the molecule, said ethoxylated oleamide normally being insoluble in a 0.10% by weight concentration in paraffinic oil at 75° F. to 80° F., to its paraffinic oil-soluble form comprising:
    (a) admixing each part by weight portion of said ethoxylated oleamide to be solubilized,
    (b) with a 2 to 10 parts by weight portion of phenol alkylated with propeylene tetramer, said alkylated phenol having a molecular weight of about 284, until a paraffinic oil-soluble ethoxylated oleamide is produced.

14. The process for converting ethoxylated stearyl methyl ammonium chloride containing about 5 ethoxylate groups in the molecule, said ethoxylated stearyl methyl ammonium chloride normally being insoluble in a 0.10% by weight concentration in paraffinic oil at 75° F. to 80° F., to its paraffinic oil-soluble form comprising:
    (a) admixing each part by weight portion of said ethoxylated stearyl methyl ammonium chloride to be solubilized,
    (b) with a 2 to 10 parts by weight portion of phenol alkylated with propylene tetramer, said alkylated phenol having a molecular weight of about 284, until a paraffinic oil-soluble ethoxylated stearyl methyl ammonium chloride is produced.

15. The process for converting ethoxylated oleyl methyl ammonium chloride containing about 5 ethoxylate groups in the molecule, said ethoxylated oleyl methyl ammonium chloride normally being insoluble in a 0.10% by weight concentration in paraffinic oil at 75° F. to 80° F., to its paraffinic oil-soluble form comprising:

(a) admixing each part by weight portion of said ethoxylated oleyl methyl ammonium chloride to be solubilized, (b) with a 2 to 10 parts by weight portion of phenol alkylated with propylene tetramer, said alkylated phenol having a molecular weight of about 284, until a paraffinic oil-soluble ethoxylated oleyl methyl ammonium chloride is produced.

16. The process for converting ethoxylated stearamide containing about 5 ethoxylate groups in the molecule, said ethoxylated stearamide normally being insoluble in a 0.10% by weight concentration in paraffinc oil at 75° to 80° F., to its paraffinc oil-soluble form comprising:

(a) admixing each part by weight portion of said ethoxylated strearamide to be solubilized, (b) with a 2 to 10 parts by weight portion of penol alkylated with propylene tetramer, said alkylated phenol having a molecular weight of about 284, until a paraffinic oil-soluble ethoxylated stearamide is produced.

17. The process for converting ethoxylated and propoxylated ethylene diamine having a molecular weight of 2700, said ethoxylated and propoxylated ethylene diamine containing a weight ratio of ethoxylate to propoxylate in the molecule of 9:1, said ethoxylated and propoxylated ethylene diamine normally being insoluble in a 0.10% by weight concentration in paraffinic oil at 75° F. to 80° F. to its paraffinic oil-soluble form comprising:

(a) admixing each part by weight of said ethoxylated and propoxylated ethylene diamine to be solubilized, (b) with a 2 to 10 parts by weight portion of phenol alkylated with propylene tetramer, said alkylated phenol having a molecular weight of about 284, until a paraffinic oil-soluble ethoxylated ethylene diamine is produced.

References Cited

UNITED STATES PATENTS

| 3,368,972 | 2/1968 | Otto | 252—51.5 R |
| 3,448,047 | 6/1969 | Traise et al. | 252—51.5 R |
| 3,456,013 | 7/1969 | Egan et al. | 252—51.5 R |

WERTEN F. W. BELLAMY, Primary Examiner

U.S. Cl. X.R.

252—52, 56, 45, 34, 51.5 A, 51.5 R; 260—563, 584, 567.5, 567.6, 551 R, 404.5